United States Patent [19]
Ohtsuka

[11] Patent Number: 5,991,034
[45] Date of Patent: Nov. 23, 1999

[54] INTERFEROMETER WHICH VARIES A POSITION TO BE DETECTED BASED ON INCLINATION OF SURFACE TO BE MEASURED

[75] Inventor: Masaru Ohtsuka, Machida, Japan

[73] Assignee: Canon Kabushiki Kaisha, Tokyo, Japan

[21] Appl. No.: 08/997,483

[22] Filed: Dec. 23, 1997

[30] Foreign Application Priority Data

Dec. 27, 1996 [JP] Japan .................................. 8-349534

[51] Int. Cl.⁶ .................................................. G01B 9/02
[52] U.S. Cl. ........................................... 356/349; 356/360
[58] Field of Search .................... 356/349, 351, 356/359, 360

[56] References Cited

U.S. PATENT DOCUMENTS

| | | | |
|---|---|---|---|
| 4,611,916 | 9/1986 | Yoshizumi | 356/360 |
| 5,135,307 | 8/1992 | De Groot et al. | 356/359 |
| 5,485,275 | 1/1996 | Ohtsuka | 356/360 |

OTHER PUBLICATIONS

Yoshizumi, K., et al., Precise Measuring System for Aspheric Surfaces, Optics, vol. 12, No. 6, pp. 450–454 (Dec. 1983).

Bruning, J.H. et al., Digital Wavefront Measuring Interferometer for Testing Optical Surfaces and Lenses, Applied Optics, vol. 13, No. 11, pp. 2693–2703 (Nov. 1974).

Primary Examiner—Samuel A. Turner
Attorney, Agent, or Firm—Fitzpatrick, Cella, Harper & Scinto

[57] ABSTRACT

An interferometer which can vary a direction of an incident beam and which enables more accurate measurement while avoiding eclipse includes an optical system adapted to form an interference beam from a beam from a surface to be measured, and a detected position varying member for varying a position to be detected of the interference beam in accordance with information on inclination of the surface to be measured.

17 Claims, 8 Drawing Sheets

FIG.5A
FIG.5B
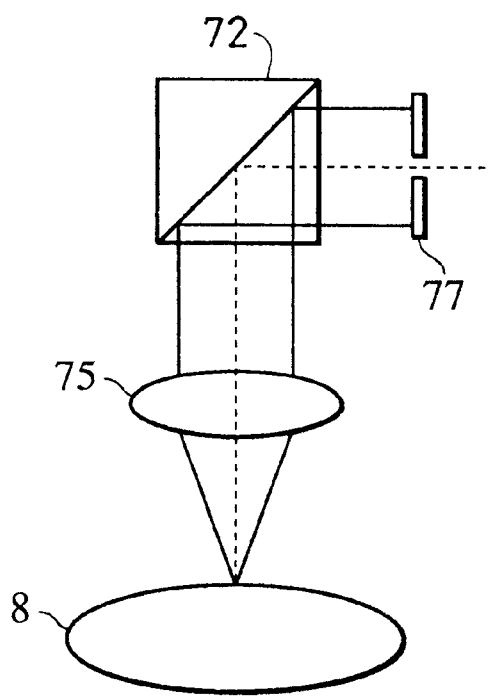
NO FACE INCLINATION
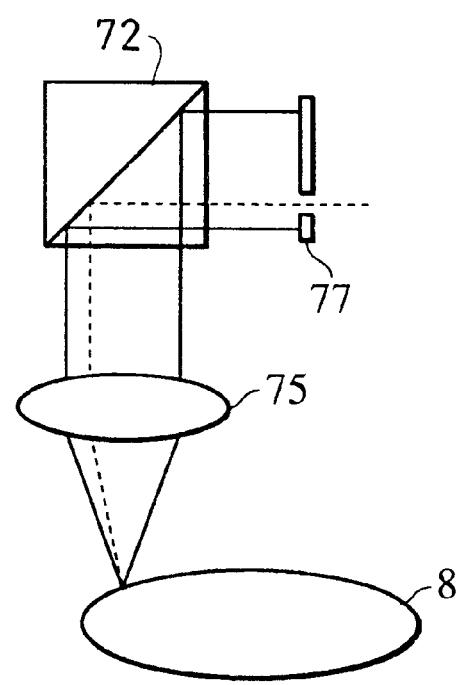
FACE INCLINATION

INTERFEROMETER WHICH VARIES A POSITION TO BE DETECTED BASED ON INCLINATION OF SURFACE TO BE MEASURED

BACKGROUND OF THE INVENTION

1. Field of the Invention

The present invention relates to an interferometer and to a shape measuring device using an interferometer. The present invention provides a device for measuring the surface shape of a relatively-large diameter lens, mirror, die, etc. used in a camera, a video, a semiconductor manufacturing apparatus or the like. The device is particularly suitable for the measurement of an aspheric shape which is hard to measure with an ordinary interferometer.

2. Description of the Related Art

As conventional examples of the art, two measuring devices disclosed in K. Yoshizumi et al., *Precise Measuring System for Aspheric Surfaces*, Optics, vol. 12, No. 6, pp 450–454 (December, 1983) will be described.

FIG. 1 shows the construction of the first conventional example.

In the drawing, numeral 901 indicates a Zeeman laser constituting the light source; numeral 902 indicates a beam splitter; numerals 903 and 904 indicate polarizing beam splitters; numerals 905a and 905b indicate λ/4 plates; numeral 906 indicates an objective lens; numeral 907 indicates a reference surface; numeral 908 indicates a workpiece; numeral 909 indicates a workpiece stage; numeral 910 indicates a focus detector; numerals 911a and 911b indicate beat signal detectors.

Assume two beams which are emitted from the light source Zeeman laser 901, which are polarized in directions perpendicular to each other and which have slightly different frequencies f1 and f2. These two beams are spatially separated from each other by the first polarizing beam splitter 903. The beam f1 travels straight and is transmitted through the second polarizing beam splitter 904 to be converted to circularly polarized light by the λ/4 plate 905a before it is applied to the surface of the object of measurement (workpiece) 908 on the workpiece stage 909 so as to focus thereon by the objective lens 906. Then, it returns to the objective lens 906 due to the so-called Cat's Eye reflection. It is transmitted through the the λ/4 plate 905a again to be converted to linear polarized light before it impinges upon the second polarizing beam splitter 904 in a condition in which it has been rotated by 90° from the linear polarized light before the reflection. This polarizing beam splitter 904, with a special coating, divides the returned beam into two portions, one of which is led to the first polarizing beam splitter 903 and the other of which is reflected and led to the focus detector 910.

In this device, the objective lens 906 is servo-controlled in the optical-axis direction by using a signal of the focus detector 910 so that focusing may always be effected on the workpiece surface even when the workpiece moves in a direction perpendicular to the optical axis.

On the other hand, the light beam reflected by the polarizing beam splitter 903 is converted to circularly polarized light by the λ/4 plate 905b, and reflected by the reference surface 907 arranged on the workpiece stage 909 before returning to the polarizing beam splitter 903. Since it passes through the λ/4 plate 905b again, the beam is in the form of a linear polarized light with the direction of polarization rotated by 90°. The beam is transmitted through the polarizing beam splitter 903 and directed to the beat signal detector 911b.

The beam which has been reflected by the workpiece and returned to the polarizing beam splitter 903 is also directed to the beat signal detector 911b, so that interference occurs with the light reflected by the reference surface, and a measurement beat signal is detected by the beat signal detector 911b.

This measurement beat signal is caused to interfere with the light immediately after emission from the light source to measure the difference in phase between the signal and a reference beat signal obtained by the beat signal detector 911a, and the difference in phase when scanning is performed on the workpiece in a direction perpendicular to the optical axis is integrated, whereby the shape of the workpiece is measured.

In the second conventional example shown in FIG. 2, a light beam whose diameter is smaller than the effective diameter of the objective lens 906 is used. The axis of the objective lens is also movable in a direction perpendicular to the optical axis, and the focus detector 910 is endowed with a surface inclination detecting function, a system being added by means of which servo-control is effected such that the light beam always impinges at right angles in correspondence with the surface inclination of the workpiece.

The first conventional example, described above, has a problem in that, when the surface to be measured is inclined, the reflected light is eclipsed, so that the quantity of light returned to the detector varies to an extreme degree, thereby making the measurement difficult. In particular, in the case of the measurement of an aspheric surface or the like, a more accurate measurement cannot be expected.

In the second conventional example, the problem of the first conventional example, i.e., the variation in quantity of light when the surface to be measured is inclined, can be avoided. However, due to the addition of the two axes (the X and Y-directions) to the servo system, the device is further complicated.

SUMMARY OF THE INVENTION

The present invention has been made in view of the above problems in the prior art. It is an object of the present invention to provide an interferometer and a shape measuring device which have a simple construction requiring no complicated system, such as a system for changing the direction of the incident beam, and which do not involve the problem of eclipse even in the case where the surface to be measured has large inclination variation as in the case of an aspheric surface, thereby realizing a more accurate measurement.

According to a first aspect of the present invention, an interferometer includes an optical system adapted to form an interference beam from a beam from a surface to be measured, and a detected position varying member for varying a position to be detected of the interference beam in accordance with information on inclination of the surface to be measured.

According to another aspect of the present invention, an interferometer includes an optical system for creating an interference beam by causing a reference beam transmitted by way of a reference optical path to interfere with a measurement beam substantially condensed at a condensing position on a surface to be measured, and reflected from the surface to be measured. The interferometer according to this aspect also includes a photodetector for detecting the interference beam formed by the optical system, and a detected position varying system for varying a portion of the interference beam to be detected by the photodetector in accordance with an inclination of the surface to be measured at the condensing position of the measurement beam.

According to another aspect of the present invention, a device for measuring a shape of a surface includes an optical system, a scanning system, a photodetector, a focusing system, a computing system, and a detected position varying system. The optical system forms an interference beam by causing a reference beam, transmitted by way of a reference optical path, to interfere with a measurement beam, substantially condensed at a condensing position on a surface whose shape is to be measured and thereby reflected. The scanning system performs scanning on the surface to be measured with the measurement beam. The photodetector detects the interference beam formed by the optical system. The focusing matches the surface to be measured with the condensing position of the measurement beam in accordance with an output of the photodetector. The computing system obtains information on a three-dimensional shape of the surface whose shape is to be measured, based on information on displacement of the condensing position during scanning by the scanning system. The detected position varying system varies a portion of the interference beam to be detected by the photodetector in accordance with an inclination of the surface to be measured at the position where the measurement is condensed.

According to a further aspect of the invention, a device for measuring a shape of a surface includes a measurement optical head, a scanning system, a photodetector, a control system, a computing system, and a detected position varying system. The measurement optical head causes a first beam to travel by way of a reference optical path, and causes a second beam, of a frequency different from the first beam, to substantially condense at a condensing position on a surface whose shape is to be measured, and then causes the first and second beams to interfere with each other. The scanning system performs scanning on the surface whose shape is to be measured with the second beam. The photodetector detects the interference beam formed by the measurement optical head. The control system effects relative displacement between the surface to be measured and the measurement optical head to compensate for variation in a difference in phase between a beat output from the photodetector and a beat signal serving as a reference. The computing system obtains information on a three-dimensional shape of the surface whose shape is to be measured based on information on relative displacement of the surface whose shape is to be measured and the measurement optical head. The detected position varying system varies a portion of the interference beam to be detected by the photodetector in accordance with an inclination of the surface whose shape is to be measured at the condensing position.

Other objects of the present invention will become apparent from the following detailed description of the preferred embodiments.

BRIEF DESCRIPTION OF THE DRAWINGS

FIGS. 5A and 5B are diagrams illustrating operation with respect to surface inclination in the first embodiment of the present invention;

DESCRIPTION OF THE PREFERRED EMBODIMENTS

Figure 3:
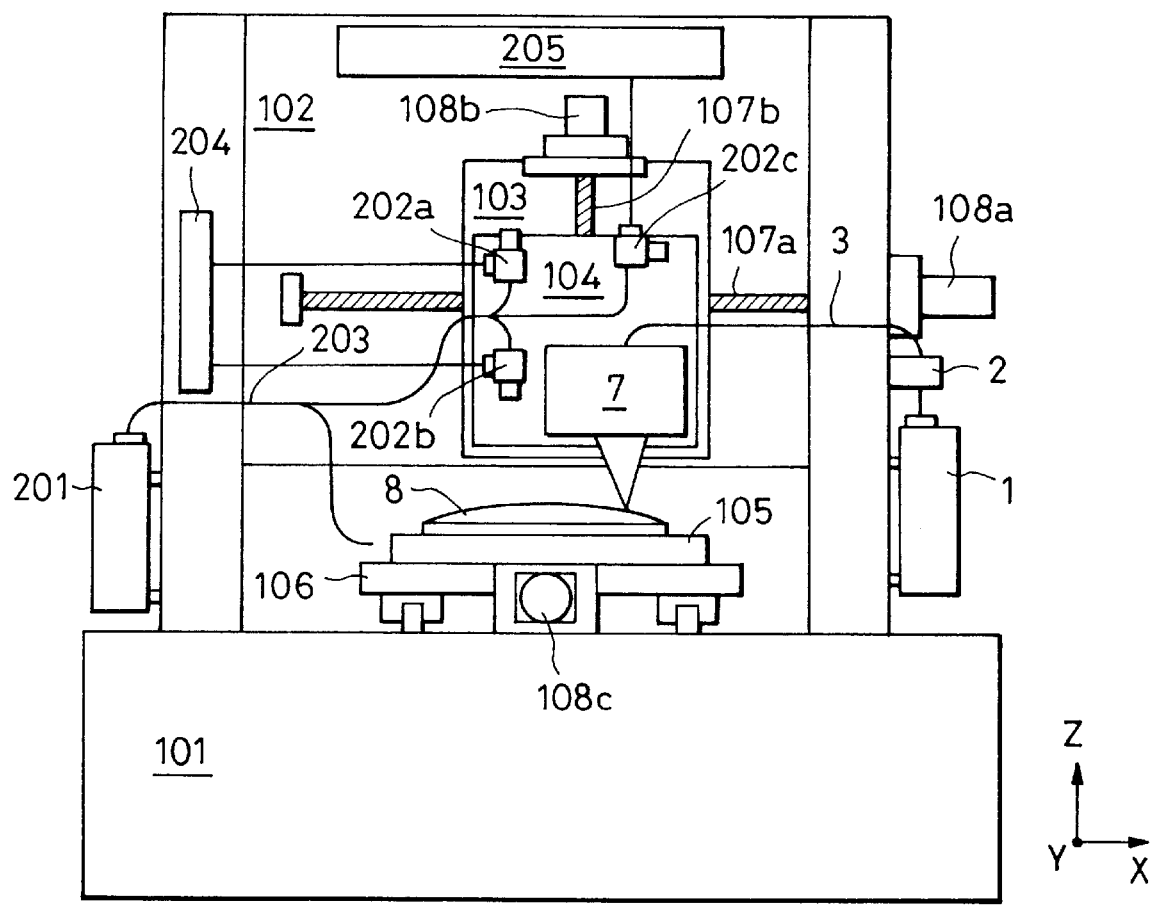
FIG. 3 is a front view showing the general construction of a first embodiment of the present invention.
Figure 4:
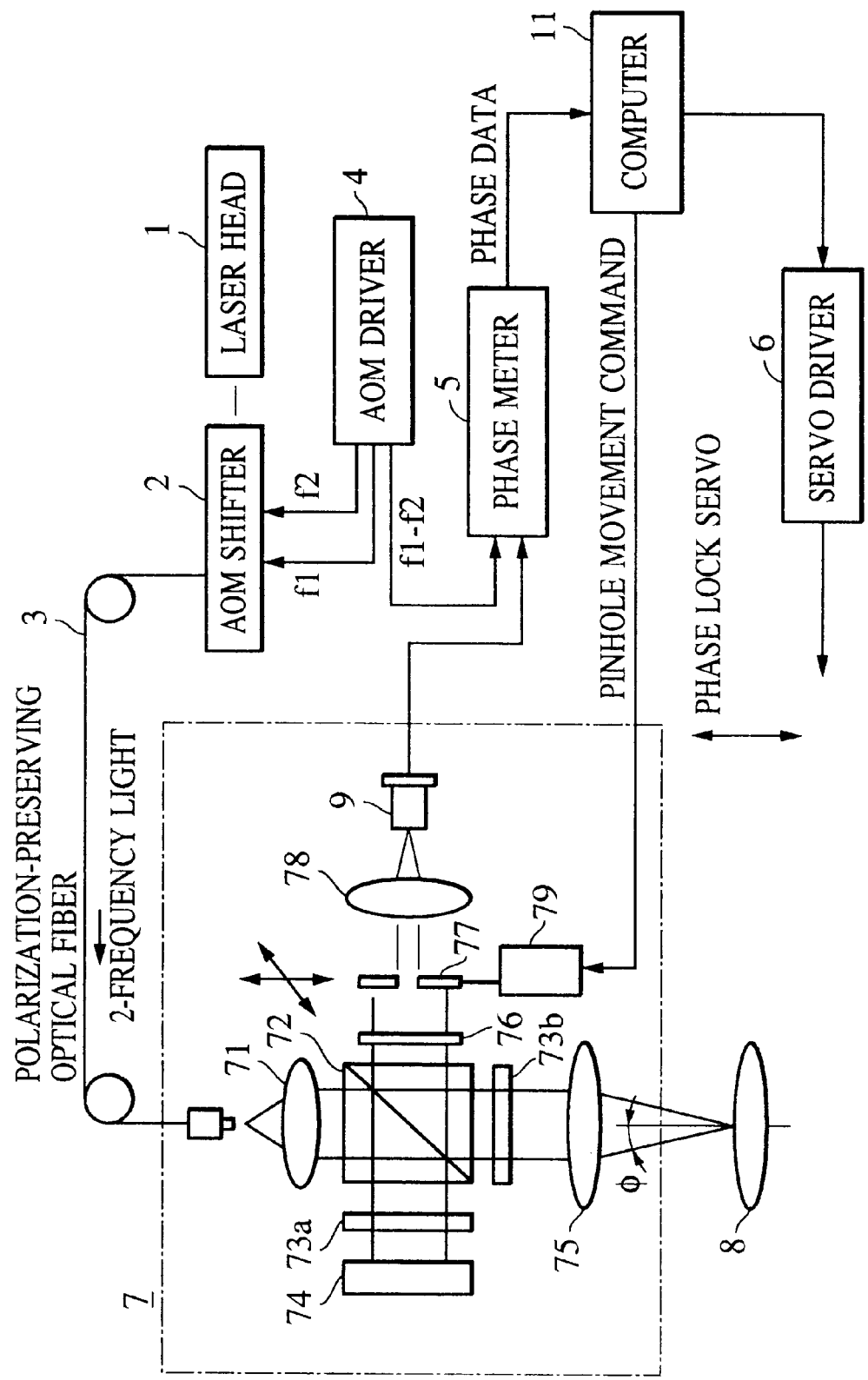
FIG. 4 is a detailed view showing the optical head portion of the first embodiment of the present invention.

FIGS. 3 and 4 show the first embodiment of the present invention. FIG. 3 is a general front view of an example of the construction of the device of the present invention, and FIG. 4 is a partial view showing the measurement optical head in the example of the construction of the present invention.

First, the general mechanical construction of the device will be described with reference to FIG. 3.

In the drawing, numeral 1 indicates a laser head constituting the light source; numeral 2 indicates an AOM frequency shifter for converting an incident beam to two frequency beams having slightly different frequencies; numeral 3 indicates a polarization-preserving optical fiber; numeral 7 indicates a measurement optical head; numeral 8 indicates a workpiece to be measured; numeral 101 indicates a base plate; numeral 102 indicates a column; numeral 103 indicates an X-translation table; numeral 104 indicates a Z-translation table; numeral 105 indicates a workpiece holder; numeral 106 indicates a Y-translation table; numerals 107a and 107b indicate ball screws; numerals 108a, 108b and 108c indicate table driving motors; numeral 201 indicates a laser length measuring device head; numerals 202a, 202b and 202c indicate interferometers for the laser length measurement device; numeral 203 indicates an optical fiber for the laser length measuring device; and numerals 204 and 205 indicates reference plane mirrors for position measurement.

An X-Y-Z orthogonal coordinate system will be assumed on the measuring apparatus. The measurement optical head 7 is arranged on the Z-translation table 104 arranged on the X-translation table 103, and its measurement optical axis coincides with the Z-axis.

Regarding the positions of the Y and Z-translation tables, a beam emitted from the laser length measurement device head 201 is led to the interferometers 202a, 202b, 202c, etc. by the optical fiber 203, whereby the relative positional relationship with respect to the reference mirrors 204 and 205 for position measurement can be accurately measured.

Similarly, regarding the Y-translation table, an interferometer for the laser length measurement device and a reference mirror for position measurement (not shown) are arranged, and the relative position with respect to the reference mirror can be accurately measured.

An orthogonal coordinate measurement system is formed by these interferometers for the laser length measurement devices, and displacement amounts along the X, Y and Z-axes of the measurement optical head 7 can be accurately measured.

Further, these translation tables are freely movable due to the action of the ball screws 107a and 107b and the table driving motors 108a, 108b and 108c.

Thus, due to this construction, the positional relationship between the measurement optical head 7 and the workpiece 8 to be measured can be arbitrarily varied in the X-Y-Z orthogonal coordinate system, and the positional relationship can be accurately measured.

Next, the construction and operation of the measurement optical head 7 will be described with reference to FIG. 4.

In the drawing, numeral 4 indicates an AOM driver; numeral 5 indicates a phase meter; numeral 6 indicates a servo driver; numeral 8 indicates a workpiece; numeral 9 indicates a photodetector; and numeral 11 indicates a computer. Within measurement optical head 7, in addition to photodetector 9, numeral 71 indicates a collimator lens; numeral 72 indicates a polarization beam splitter; numerals 73a and 73b indicate λ/4 plates; numeral 74 indicates a reference surface; numeral 75 indicates an objective lens; numeral 76 indicates a polarizing plate; numeral 77 indicates a pin hole capable of moving in a direction perpendicular to the optical axis; numeral 78 indicates a condensing lens; and numeral 79 indicates a pin hole driving device.

A laser beam emitted from the light source 1 is converted to beams which have slightly different frequencies whose directions of polarization are perpendicular to each other due to the action of the AOM shifter 2, and then impinges upon the polarization-preserving optical fiber 3 before it is transmitted through the fiber line to be led to the measurement optical head 7, the two frequency beams being emitted from the end portion while maintaining their directions of polarization. The beams emitted from the optical fiber diverge, so they are converted to parallel beams by the collimator lens 71 before impinging upon the polarizing beam splitter 72. Of the two frequency beams, one is reflected and travels toward the reference surface 74, and the other is transmitted through the beam splitter 72 and travels toward the workpiece 8.

The beam travelling toward the reference surface 74 is converted to circularly polarized light by the λ/4 plate 73a and undergoes regular reflection on the reference surface 74 before it passes through the the λ/4 plate 73a again and converted to a linear polarized light to be returned to the polarizing beam splitter 72. Since the direction of polarization has been rotated by 90°, it is transmitted through the beam splitter 72 this time and travels toward the photodetector 9.

Similarly, the beam travelling toward the workpiece 8 is converted to circularly polarized light by the λ/4 plate 73b and turned into a convergent beam by the objective lens 75 before focusing on the surface of the workpiece 8. This convergence point is the detection point on the workpiece 8. This beam is reflected by the workpiece 8 due to the so-called Cat's eye reflection, and returns through the objective lens 75 and the λ/4 plate 73b before it is converted to a linear polarized light to be returned to the optical beam splitter 72. Since the direction of polarization has been rotated by 90°, it is reflected this time and travels toward the photodetector 9.

The objective lens 75 has a half-aperture angle (φ) which is larger than the maximum surface inclination angle θmax of the workpiece. The beam impinging upon the objective lens 75 is taken in so as to fill the aperture. Generally, sin φ will be referred to as the lens numerical aperture NA.

The beams reflected by the reference plane 74 and the workpiece 8 are caused to interfere by the action of the polarizing plate 76 having a polarization axis which is at 45° with respect to the polarization directions of the beams. Then, part of this interference beam is selected through the pin hole 77, and, due to the operating principle described below, only that beam portion which is near the beam that has impinged upon the workpiece 8 at right angles is allowed to impinge upon the photodetector 9 through the condensing lens 78. By this photodetector 9, a so-called frequency beat signal corresponding to the difference between the two frequencies is observed.

By measuring the variation in the difference in phase between this measured beat signal (hereinafter referred to as the "measurement beat signal" and a beat signal serving as a reference described below (hereinafter referred to as the "reference beat signal"), the variation in the difference in optical path length between the beam travelling toward the reference plane and the beam travelling toward the workpiece can be seen. In view of this, the position of the measurement optical head 7 in the optical axis direction is controlled so that this difference in phase may be kept constant. That is, based on the information on the variation in phase difference transferred from the phase meter 5, the computer 11 controls the table driving motor 108b through the servo driver 6, and causes the Z-translation table 104 to move vertically so that the variation in phase difference may be reduced to zero (that is, the phase difference may be fixed), the measurement optical head 7 being positionally servo-controlled in the optical axis direction (phase lock servo), whereby the position at which the beam is condensed by the objective lens 75 can always be adapted to the measurement surface of the workpiece.

Figure 1:
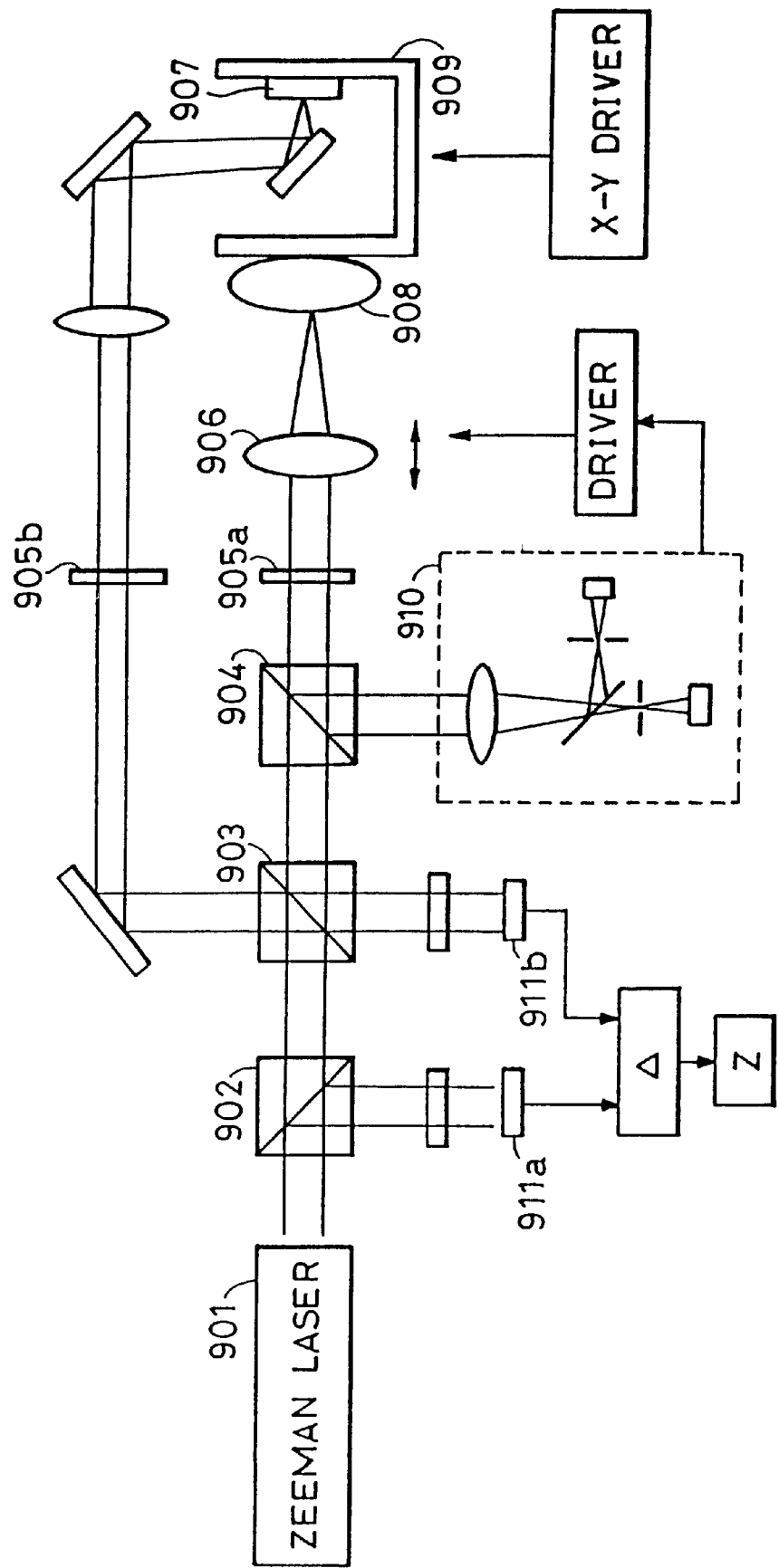
FIG. 1 is a diagram illustrating the first conventional example.
Figure 2:
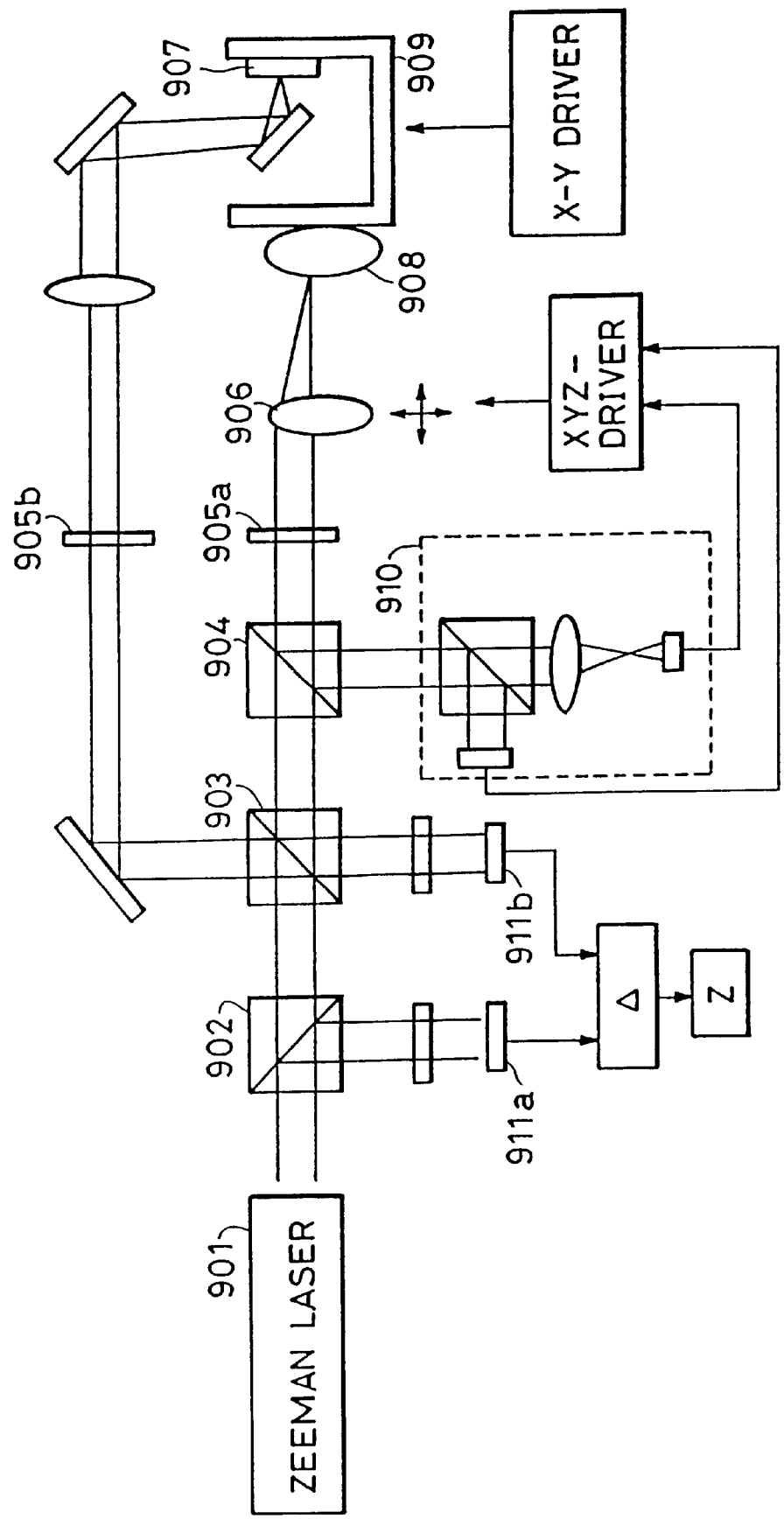
FIG. 2 is a diagram illustrating the second conventional example.

Maintaining this phase lock servo, the relative positions of the workpiece 8 and the measurement optical head 7 are varied in a plane perpendicular to the optical axis (in the XY-plane), and the displacing amount of the measurement optical head 7 is read by another orthogonal coordinate measurement system while beam-scanning the workpiece 8, whereby the displacement in the X and Y-directions of the measurement optical head 7 represents measurement position information of the workpiece 8, and the displacement in the Z-axis direction represents information on the displacement in the Z-axis direction of the condensing position, that is, information on the height of the measurement position, so that the three-dimensional configuration of the surface of the workpiece 8 is eventually measured. That is, as shown with reference to the construction of FIG. 1, the relative positions of the workpiece 8 and the measurement optical head 7 can be arbitrarily moved and measured within the orthogonal coordinate system of the device, so that, by moving the X and Y-movement stages in accordance with a predetermined pattern while servo-controlling the Z-stage 104 by the signal from the optical head, and reading the Z-position in the predetermined XY-positions, measurement of a three-dimensional shape is possible in accordance with the principle.

In this embodiment, the reference beat signal input to the phase meter 5 is transmitted from the ROM driver 4 through a mixer circuit (not shown) to output the difference between the two drive frequencies (f1–f2). Instead of this arrangement, it is also possible to cause the beam to interfere immediately before impinging upon the interferometer to thereby obtain a reference beat signal, as in the conventional example.

Described next is the operating principle of the movable pin hole 77 for allowing only the beam portion near the beam impinging upon the workpiece 8 at right angles to pass through the condensing lens 78 before impinging upon the photodetector 9. In this embodiment, as shown in FIG. 5A, when the normal of the surface to be measured substantially coincides with the measurement optical axis, that is, when there is no surface inclination at the detection point, the central portion of the returning beam is selected and detected by the pin hole 77 to thereby obtain a signal.

When, as shown in FIG. 5B, the normal of the surface to be measured does not coincide with the measurement optical axis, that is, when there is surface inclination at the detection point, a position corresponding to the specular reflection of the returning beam is selected and detected by the pin hole 77 to thereby obtain a signal. That is, in this case, the pin hole 77 is moved perpendicularly to the optical axis direction by the pin hole driving device 79 to the position where the reflected beam in the direction of the normal from the detection point at the inclination of the detection point impinges based on information on the inclination of the workpiece 8 stored in the computer or information on the proper position of the pin hole in accordance with this inclination, whereby that portion of the interference beam which is detected by the photodetector 9 is varied such that the beat signal intensity is maximum. In other words, in this embodiment, due to the operation of the pin hole 77 and the photodetector 9, the detecting position in the interference beam is such that the beat signal intensity is maximum.

In this embodiment, the pin hole 77 is arranged in the parallel beam portion of the optical system, so that the angle of the normal of the detection point, that is, the angle of the reflected beam in the direction of the normal at the detecting point, can be easily converted to the position of the pin hole 77.

The objective lens 75 has a half-aperture angle not smaller than the maximum inclination angle of the workpiece, so that, even if a probe beam impinges upon a place where the surface inclination is steep, part of it can always be led to the detection system. Thus, by moving the pin hole 77 to a place where the specular reflection beam passes, the detection of measurement beat signals can be effected without interruption.

The position of this pin hole can be easily calculated by, for example, calculating beforehand the surface inclination corresponding to the XY coordinates from the design shape of the workpiece, so that it can be moved by open control in accordance with an instruction from the computer 11 storing (or calculating) it. When the design shape is not clear, it is calculated by using shape data measured beforehand by some other, low-accuracy measuring device. That is, for example, in a condition in which the pin hole 11 is removed from the optical system beforehand, measurement is performed in the same way as described above except for the driving of the pin hole, and surface inclination information is calculated by the computer 11 from the obtained three-dimensional shape information and is stored. It is possible to achieve a sufficient degree of accuracy from the viewpoint of practical use even when the surface inclination information measured is rough to some extent as compared to detailed three-dimensional shape information.

Next, a method of avoiding the influence of the aberrations of the optical system in this embodiment will be described.

In this embodiment, phase lock servo control is effected on the entire optical head, and the surface of the workpiece is traced with the optical head so as to keep a fixed space therebetween, so that, if there are aberrations due to optical parts in the optical head, for example, the objective lens 75 and the reference plane 74, the phase of the specularly reflected beam corresponding to the surface inclination of the workpiece varies independently of the shape of the workpiece, resulting in a measurement error. In view of this, the error due to aberration is corrected beforehand in the manner described below.

Figure 6:
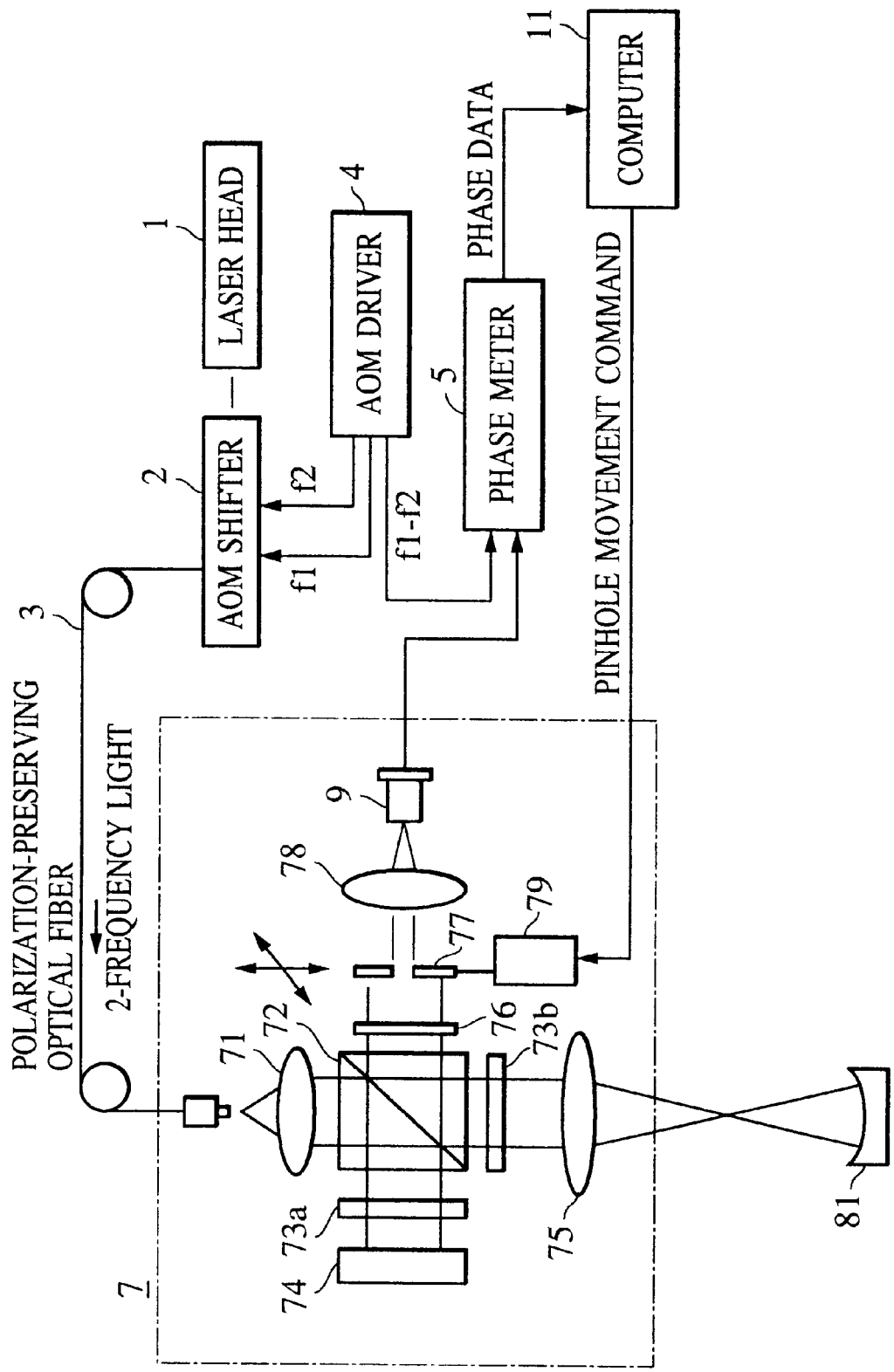
FIG. 6 is a diagram illustrating aberration correction of the optical system of the first embodiment of the present invention.

As shown in FIG. 6, a reference workpiece 81 accurately shaped into a spherical surface is prepared, and arranged at a position (confocal position) where its radius of curvature coincides with the radius of curvature of a spherical wave formed by the objective lens 75. In this condition also, both the beam returning from the reference plane 74 and the beam returning after being reflected by the reference workpiece 8 substantially consist of plane waves, so that a measurement beat signal can be detected by the photodetector 9. In this condition, the phase lock servo control of the measurement optical head 7 is turned off, and the movable pin hole 77 is displaced to scan the entire beam range, measuring the phase distribution data and recording it in the computer 11 (i.e., the recording medium belonging thereto). Further, this data is subjected to Zernike's polynomial analysis by the computer 11, and those components of the measured phase distribution attributable to mechanical alignment errors of the reference workpiece 81, the reference plane 74, etc., such as tilting and defocusing thereof, are independently extracted and removed from the measured phase distribution, recording and storing the eventually obtained phase distribution.

If the spherical surface accuracy of the reference workpiece 81 is sufficiently high, this phase distribution data represents the aberration of the optical system. Thus, the computer 11 stores this as correction data, and, when actually performing measurement, this correction data is subtracted from the obtained phase-difference data in accordance with the arrangement of the movable pin hole 77 arranged and placed under control. Based on this corrected data, the phase lock servo control of the measurement optical head 7 is executed. Alternatively, the phase lock servo is left as it is, and the error is calculated and subtracted from the obtained three-dimensional shape information based on the above-mentioned correction data, whereby the influence of the optical system aberrations can be eliminated.

When the spherical surface accuracy of the reference workpiece 81 is insufficient, the spherical surface error of the reference workpiece 81 can be separated by performing data measurement three times with the optical arrangement varied, as disclosed by J. H. Bruning, *Digital Wavefront Measuring Interferometer for Testing Optical Surfaces and Lenses*, Applied Optics, Vol. 13, No. 11, pp.2693–2703 (1974).

That is, assuming that the measurement phase distribution in the arrangement of FIG. 6 is W1, that the phase distribution when measurement is similarly performed with the reference workpiece 81 rotated by 180° around the optical axis in the drawing is W2, and that the phase distribution when measurement is similarly performed through Cat's eye reflection as shown in FIG. 4 is W3, the following equation holds true:

$$\text{Werr}=(W1-\underline{W2}+W3+\underline{W3})/2 \tag{1}$$

where the underlines mean the rotation of measured phase distribution data by 180° around the optical axis. This calculation result provides a pure optical-axis aberration Werr, not including the influence of the reference workpiece 81. This result is recorded and stored.

By using the optical system aberrations data thus obtained, correction is executed as described above in correspondence with the position of the pin hole moved during ordinary optical probe measurement, whereby it is possible to eliminate the influence of the optical system aberrations.

Figure 7:
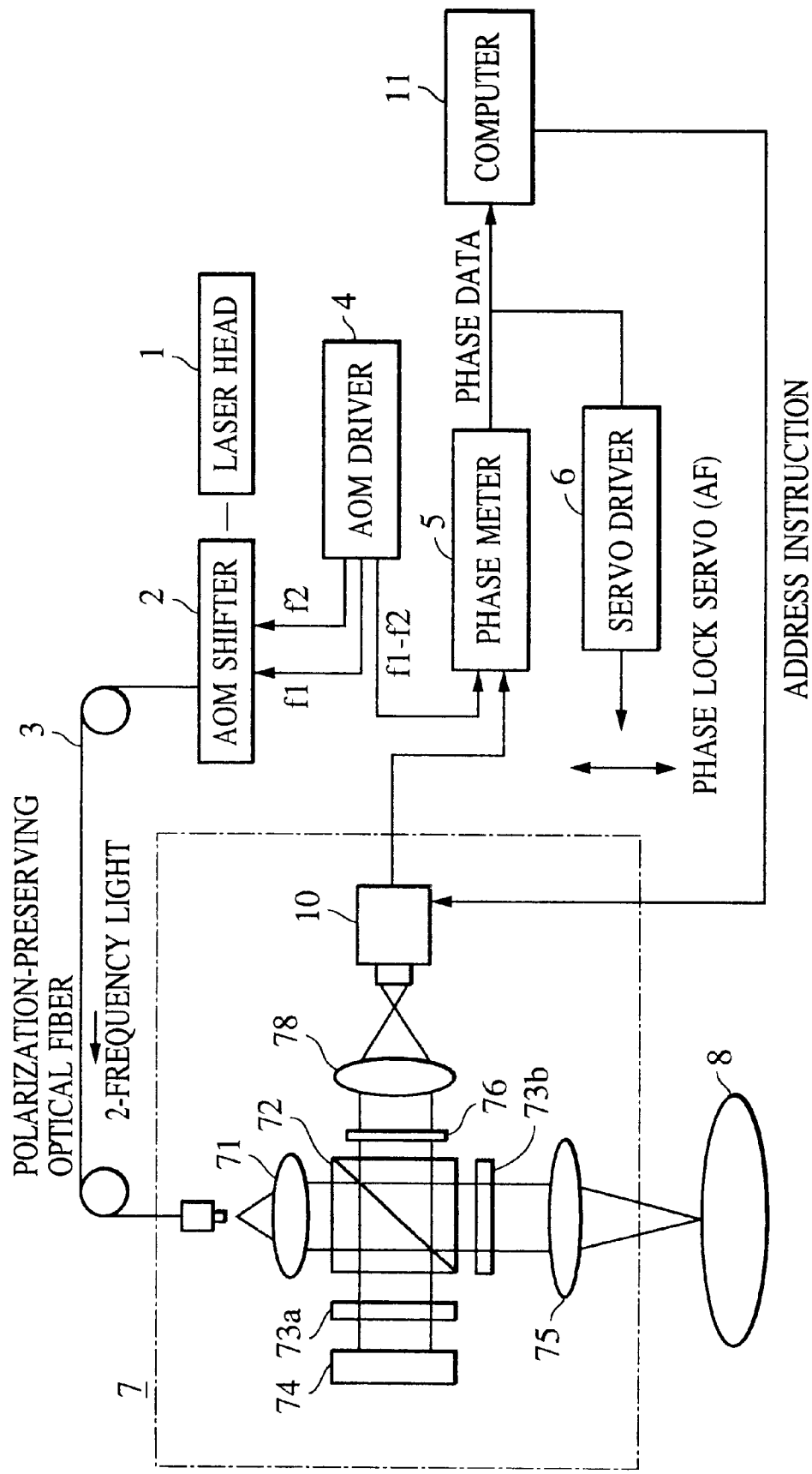
FIG. 7 is a detailed view showing the optical head portion of a second embodiment of the present invention.

FIG. 7 shows the second embodiment of the present invention. In this embodiment, the components which are the same as those of the above embodiment are indicated by the same reference numerals, and a description of such components will be omitted. Further, a description of the construction and operation which are the same as those of the above embodiment will also be omitted.

In the drawing, the second embodiment differs from the first embodiment in that the means for detecting a measurement beat signal including the movable pin hole 77 is replaced by a random access camera 10 using an image dissector tube, etc.

This special camera 10 is capable of selectively extracting signals from minute sections addressed by instructions from the computer 11 from among the light intensity signals of a beam impinging upon a photosurface distributed two-dimensionally. It can be operated in the same way as the combination of the movable pin hole and the photodetector in the first embodiment. That is, based on information on the inclination of the work-piece 8 or information on the proper detecting position in correspondence with this inclination, the position is determined where the reflected beam perpendicularly from the detecting point on the image detecting surface of the random access camera 10 impinges, and a minute section near this position is selected and a signal therefrom is used for measurement, whereby it is possible to realize a more accurate shape measurement without interrupting the detection of the measurement beat signals.

In this embodiment, there is no component that is mechanically moved, and address change can be effected at high speed, which is suitable for more accurate and high-speed measurement.

Figure 8:
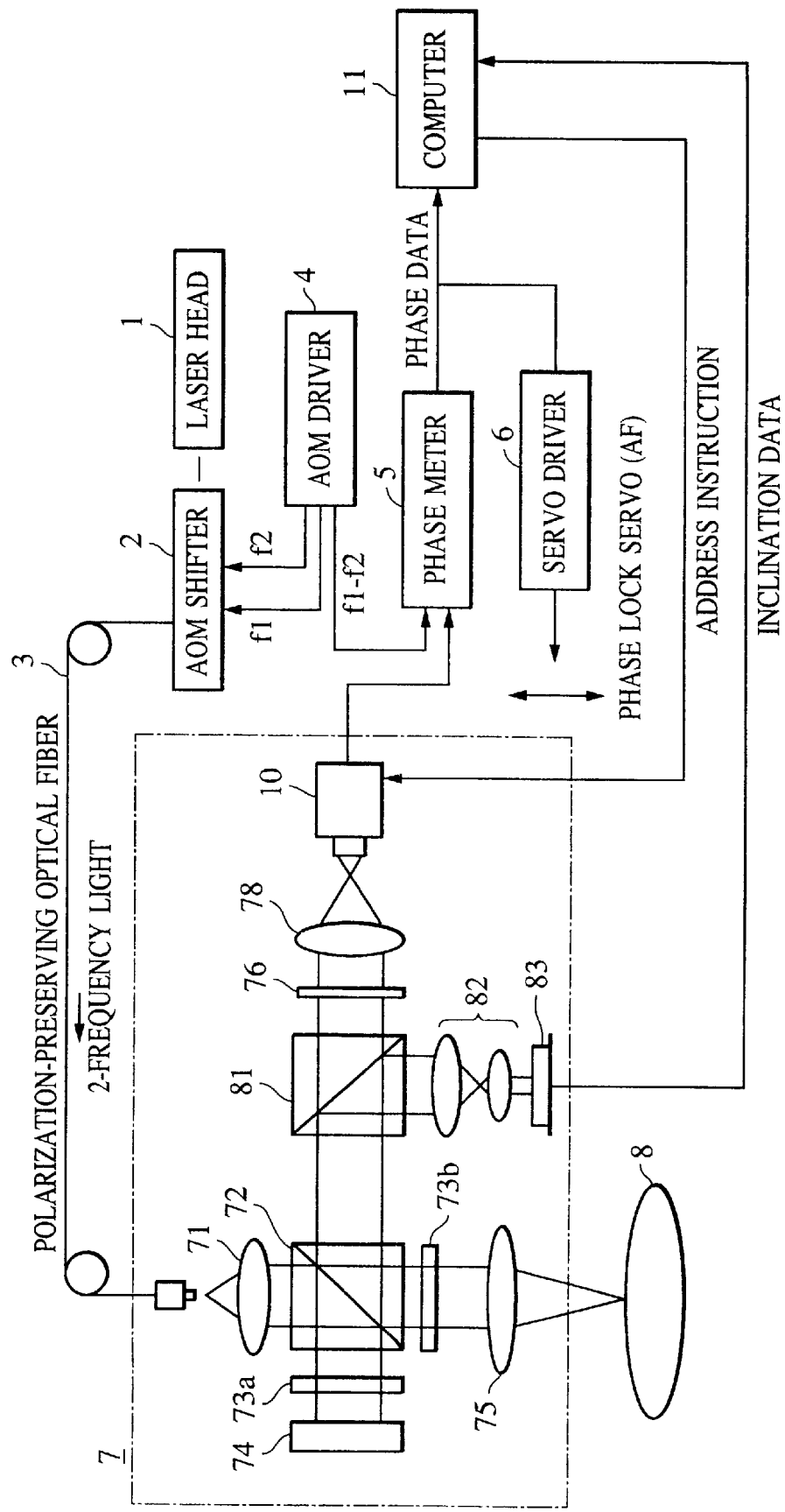
FIG. 8 is a detailed view showing the optical head portion of a third embodiment of the present invention.

FIG. 8 shows the third embodiment of the present invention. This embodiment is a further modification of the second embodiment. As in the second embodiment, the components which are the same as those in the earlier embodiments are indicated by the same reference numerals, and a description of such components will be omitted. Further, the description of the construction and operation which are the same as those of the earlier embodiments will be omitted.

In this embodiment, there is arranged between a polarizing beam splitter 72 and a polarizing plate 76 a polarizing beam splitter 81 which is adjusted so as to reflect only a small part of the beam reflected by the workpiece 8 and reflected by the polarizing beam splitter 72, only the reflected beam from the workpiece 8 being branched off. The reflected beam from this polarizing beam splitter 81 is converted into a parallel beam of a small diameter by an afocal optical system 82, and is detected by a beam position detecting device 83, such as a two-dimensional CCD.

Due to this construction, information on the detecting point inclination on the workpiece 8 can be detected as a beam detection position on the beam position detecting device 83. This detection information is transmitted to the computer 11, where, based on the inclination information obtained, the position is determined where the beam reflected perpendicularly from the detecting point impinges on the image detecting surface of the random access camera 10, and a minute section near this impinging position is selected, and a signal therefrom is used for measurement. With this arrangement, it is possible to realize a more accurate shape measurement without interrupting the detection of the measurement beat signals.

In this embodiment, the incident position of the reflected beam perpendicularly can be determined more accurately in correspondence with the inclination of the detecting point at the time of measurement, which is suitable for more accurate measurement.

The individual components shown in outline or designated by blocks in the drawings are well-known in the art. Their specific construction and operation are not critical to the operation or best mode for carrying out the invention.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation to encompass all such modifications and equivalent structures and functions.

What is claimed is:

1. An interferometer comprising:
   an optical system adapted to form an interference beam from a beam from a surface to be measured;
   a detected position varying member for varying a position to be detected of the interference beam in accordance with information on inclination of the surface to be measured; and
   an inclination detecting system for obtaining information on the inclination of the surface to be measured,
   wherein said detected position varying member varies the portion of the interference beam to be detected by said photodetector in accordance with the information detected by said inclination detecting system.

2. An interferometer according to claim 1, wherein said detected position varying member comprises a pin hole which is movable in a direction perpendicular to the optical axis.

3. An interferometer according to claim 1, wherein said detected position varying member comprises a random access camera for detecting the interference beam, the detecting position of the interference beam being varied by varying a signal extracting position of said random access camera.

4. An interferometer comprising:
   an optical system for creating an interference beam by causing a reference beam transmitted by way of a reference optical path to interfere with a measurement beam substantially condensed at a condensing position on a surface to be measured and reflected from the surface to be measured;
   a photodetector for detecting the interference beam formed by said optical system;
   a detected position varying system for varying a portion of the interference beam to be detected by said photodetector in accordance with an inclination of the surface to be measured at the condensing position of the measurement beam; and
   an inclination detecting system for obtaining information on the inclination of the surface to be measured,
   wherein said detected position varying system varies the portion of the interference beam to be detected by said photodetector in accordance with the information detected by said inclination detecting system.

5. An interferometer according to claim 4, wherein said detected position varying system comprises a pin hole which is movable in a direction perpendicular to the optical axis.

6. An interferometer according to claim 4, wherein said photodetector is a random access camera, and wherein said detected position varying system varies signal extracting position of said random access camera.

7. An interferometer according to claim 4, further comprising a processing system which removes an error component due to aberration of said optical system generated in the interference beam as a result of varying the portion of the interference beam to be detected by said photodetector by said detected position varying system.

8. A device for measuring a shape of a surface, comprising:

an optical system which forms an interference beam by causing a reference beam, transmitted by way of a reference optical path, to interfere with a measurement beam, substantially condensed at a condensing position on a surface whose shape is to be measured and thereby reflected;

a scanning system for performing scanning on the surface to be measured with the measurement beam;

a photodetector for detecting the interference beam formed by said optical system;

a focusing system for matching the surface to be measured with the condensing position of the measurement beam in accordance with an output of said photodetector;

a computing system for obtaining information on a three-dimensional shape of the surface whose shape is to be measured based on information on displacement of the condensing position during scanning by said scanning system; and a detected position varying system for varying a portion of the interference beam to be detected by said photodetector in accordance with an inclination of the surface to be measured at the position where the measurement beam is condensed.

9. A device according to claim 8, wherein said detected position varying system comprises a pin hole which is movable in a direction perpendicular to the optical axis.

10. A device according to claim 8, wherein said photodetector is a random access camera, and wherein said detected position varying system varies a signal extracting position of said random access camera.

11. A device according to claim 8, further comprising an inclination detecting system for obtaining information on the inclination of the surface whose shape is to be measured, and wherein said detected position varying system varies the portion of the interference beam to be detected by said photodetector in accordance with the information detected by said inclination detecting system.

12. A device according to claim 8, wherein said computing system removes an error component due to aberration of said optical system generated in the interference beam as a result of varying the portion of the interference beam to be detected by said photodetector by said detected position varying system.

13. A device for measuring a shape of a surface, comprising:

a measurement optical head which causes a first beam to travel by way of a reference optical path, and causes a second beam of a frequency different from said first beam to substantially condense at a condensing position on a surface to be measured, and then causes the first and second beams to interfere with each other;

a scanning system for performing scanning on the surface whose shape is to be measured with the second beam;

a photodetector for detecting the interference beam formed by said measurement optical head;

a control system for effecting relative displacement between the surface to be measured and said measurement optical head to compensate for variation in a difference in phase between a beat output from said photodetector and a beat signal serving as reference;

a computing system for obtaining information on a three-dimensional shape of the surface whose shape is to be measured based on information on relative displacement of the surface whose shape is to be measured and said measurement optical head; and a detected position varying system for varying a portion of the interference beam to be detected by said photodetector in accordance with an inclination of the surface whose shape is to be measured at the condensing position.

14. A device according to claim 13, wherein said detected position varying system comprises a pin hole which is movable in a direction perpendicular to the optical axis.

15. A device according to claim 13, wherein said photodetector is a random access camera, and wherein said detected position varying system varies a signal extracting position of said random access camera.

16. A device according to claim 13, further comprising an inclination detecting system for obtaining information on the inclination of the surface whose shape is to be measured, and wherein said detected position varying system varies the portion of the interference beam to be detected by said photodetector in accordance with the information detected by said inclination detecting system.

17. A device according to claim 13, wherein said computing system removes an error component due to aberration of said optical system generated in the interference beam as a result of varying the portion of the interference beam to be detected by said photodetector by said detected position varying system.

* * * * *

UNITED STATES PATENT AND TRADEMARK OFFICE
CERTIFICATE OF CORRECTION

PATENT NO. : 5,991,034

DATED : November 23, 1999

INVENTOR(S): MASARU OHTSUKA

It is certified that error appears in the above-identified patent and that said Letters Patent is hereby corrected as shown below:

COLUMN 1

Line 43, "the the" should read --the--.

COLUMN 4

Line 36, "indicates" should read --indicate--.

COLUMN 5

Line 32, "the the" should read --the--.

COLUMN 6

Line 46, "ROM" should read --AOM--.

UNITED STATES PATENT AND TRADEMARK OFFICE
CERTIFICATE OF CORRECTION

PATENT NO. : 5,991,034

DATED : November 23, 1999

INVENTOR(S): MASARU OHTSUKA

Page 2 of 2

It is certified that error appears in the above-identified patent and that said Letters Patent is hereby corrected as shown below:

COLUMN 10

Line 19, "by said" should be deleted.
Line 20, "photodetector" should be deleted.

Signed and Sealed this

Twelfth Day of September, 2000

Attest:

Q. TODD DICKINSON

*Attesting Officer*

*Director of Patents and Trademarks*